United States Patent
Ja

(10) Patent No.: US 12,339,433 B2
(45) Date of Patent: Jun. 24, 2025

(54) COMPACT MICROSCOPE AUTO-FOCUS ASSEMBLY

(71) Applicant: ARACELI BIOSCIENCES INC., Tigard, OR (US)

(72) Inventor: Shiou-jyh Ja, Portland, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 1053 days.

(21) Appl. No.: 17/341,132

(22) Filed: Jun. 7, 2021

(65) Prior Publication Data
US 2022/0390733 A1    Dec. 8, 2022

(51) Int. Cl.
| | |
|---|---|
| *G02B 7/28* | (2021.01) |
| *G01C 3/08* | (2006.01) |
| *G02B 21/24* | (2006.01) |
| *G02B 27/10* | (2006.01) |
| *G02B 27/14* | (2006.01) |

(52) U.S. Cl.
CPC ............ *G02B 21/245* (2013.01); *G01C 3/08* (2013.01); *G02B 7/287* (2013.01); *G02B 27/106* (2013.01); *G02B 27/149* (2013.01)

(58) Field of Classification Search
CPC .... G02B 21/00; G02B 21/245; G02B 21/241; G01C 3/08
See application file for complete search history.

(56) References Cited

U.S. PATENT DOCUMENTS 7,700,903 B2    4/2010    Weiss et al.

OTHER PUBLICATIONS

Silfies, J. et al., "The Nikon Perfect Focus System (PFS)," Nikon Microscopy U Website, Available Online at https://www.microscopyu.com/tutorials/the-nikon-perfect-focus-system-pfs, Available as Early as Aug. 1, 2016, 3 pages.

*Primary Examiner* — Maurice C Smith
(74) *Attorney, Agent, or Firm* — McCoy Russell LLP

(57) ABSTRACT

Methods and systems are provided for an auto-focus system for a microscope. In one example, a method for the auto-focus system includes focusing the microscope at a glass-specimen interface of a sample by passing a primary laser beam through a beamsplitting device to generate an additional, secondary laser beam that is a mirror image of the primary laser beam. A location of an objective may be triangulated along a longitudinal axis of the microscope based on a centroid of spectral intensities of each of the primary and secondary laser beams.

20 Claims, 11 Drawing Sheets

COMPACT MICROSCOPE AUTO-FOCUS ASSEMBLY

FIELD

Embodiments of the subject matter disclosed herein relate to an auto-focus system for a microscope. The auto-focus system may utilize a laser beam as an interrogation light beam for aligning a focal point of the microscope with a target plane and/or region.

BACKGROUND

Application of an auto-focusing system to a microscope may include installation of a sensor, a control system, and a motor to focus on a target optical area of an imaging specimen. The sensor may be used to determine a correct focus of a microscope objective on the target area based on reflection of an interrogation light beam produced by a light source of the sensor. The interrogation light beam may be generated via oblique illumination to triangulate a position of the objective relative to the specimen and the motor may adjust the position of either the objective or the specimen based on the triangulation to align a focus of the microscope with the target optical area of the specimen.

The interrogation light beam may be directed from the sensor to a set of imaging optics of the microscope system by various components, such as one or more lenses, a focal plane array, a diffraction grating, etc. In one example, at least one angled mirror, such as a dichroic mirror, may be used to direct the interrogation light beam to an optical train of the microscope where the angled mirror may have a surface area corresponding to an area of an imaging aperture of the microscope. As a result, the angled mirror, as well other components may have an undesirably large footprint, contributing to a bulkiness of the microscope system and increasing costs. Furthermore, triangulation accuracy may be degraded by fluctuations in the interrogation light beam shape and launching angle which may arise as a result of electrical and/or temperature instability. Costs may therefore be further incurred due to incorporation of one or more systems providing electrical and temperature control.

BRIEF DESCRIPTION

In one example, the issues described above may be addressed by a method for focusing the microscope at a glass-specimen interface of a sample by passing a primary laser beam through a beamsplitting device to generate an additional, secondary laser beam, the secondary laser beam a mirror image of the primary laser beam. The method further includes triangulating a location of an objective relative to the glass-specimen interface along a longitudinal axis of the microscope based on a centroid of spectral intensities of each of the primary and secondary laser beams. In this way, the microscope may be focused via a system that is robust to temperature and electrical fluctuations with a reduced number of components and reduced overall footprint.

As one example, the auto-focus system may include a light source with embedded collimating elements, therefore precluding use of collimating lenses. The primary laser beam of the auto-focus system may be split into a pair of mirrored beams prior to entry into an optical train of the microscope. A path of the pair of mirrored beams from the light source to the optical train and from the optical train to a detector may be controlled by a set of mirrors positioned adjacent to an entry aperture of the optical train. The pair of mirrored beams are reflected at the sample and converted to a two-dimensional array at a detector which is used to generate a one-dimensional spectral intensity profile of the pair of mirrored beams. By determining a centroid of the spectral intensities of the pair of mirrored beams, and using coordinates of the centroid to adjust a position of the objective, the objective may be aligned with a target focal plane of the sample and maintained aligned during scanning and imaging of the sample.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
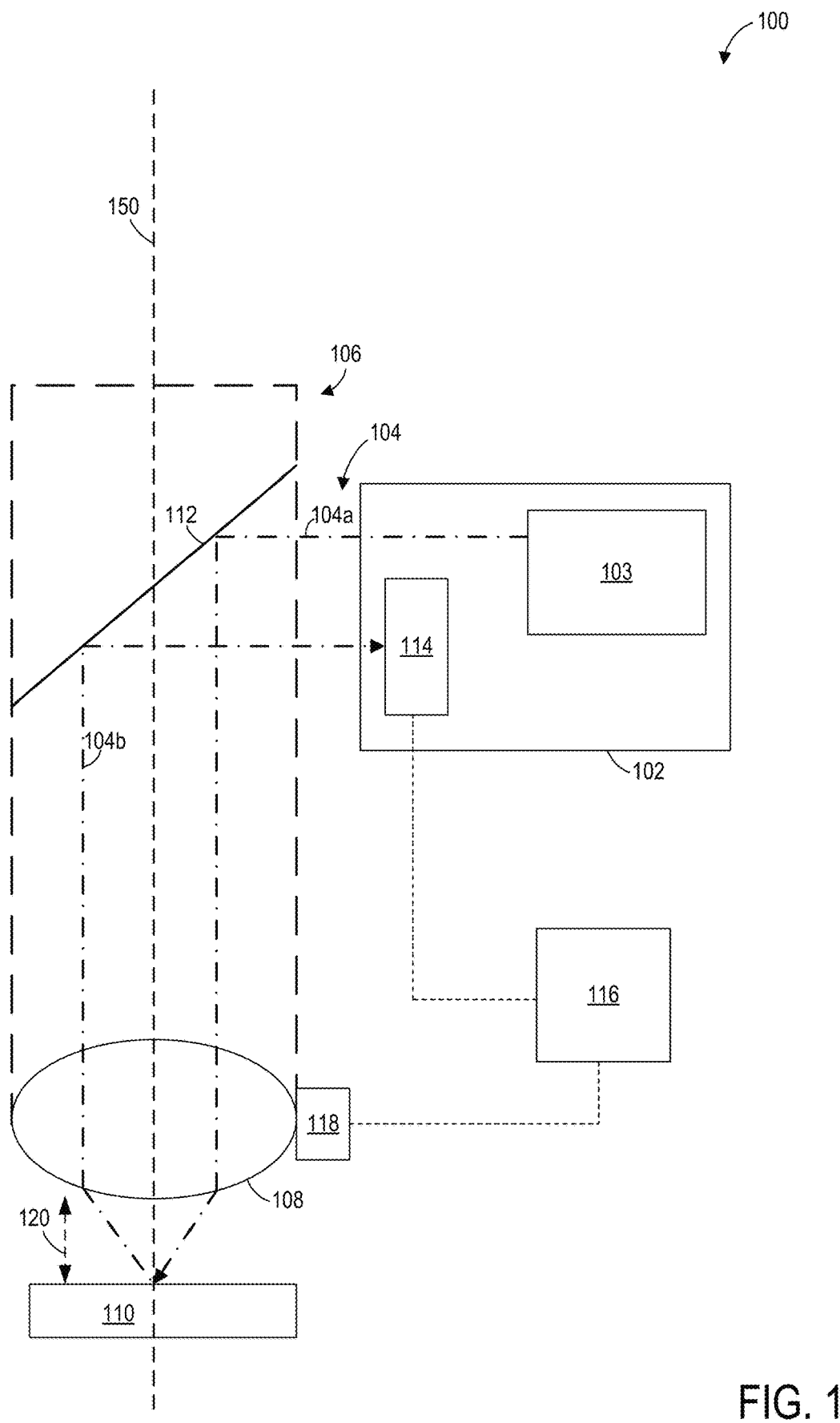
FIG. 1 shows a schematic diagram of an auto-focus system for a microscope.
Figure 2:
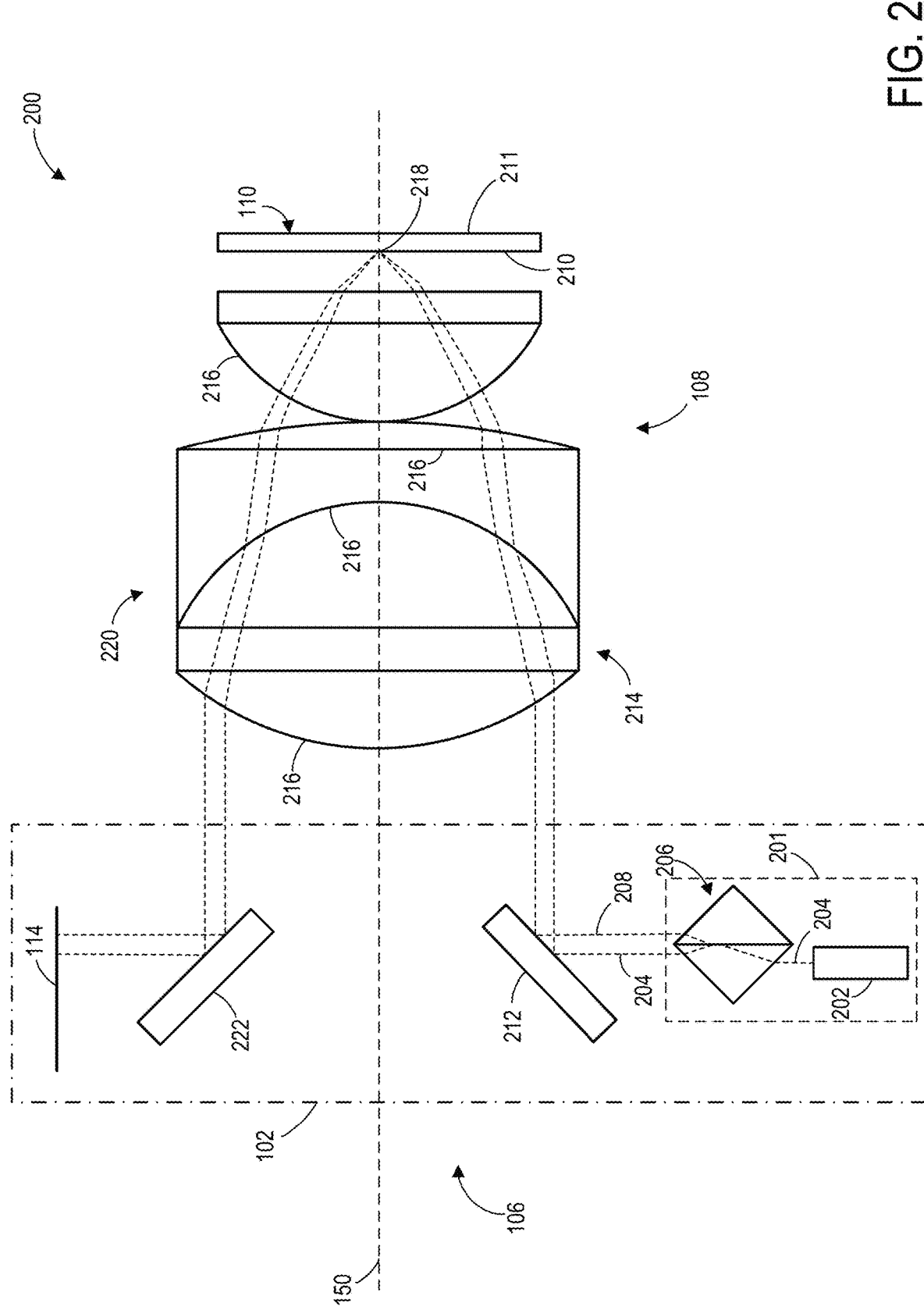
FIG. 2 shows an example of an auto-focus system utilizing a pair of mirrored laser beams as an interrogation beam.
Figure 3:
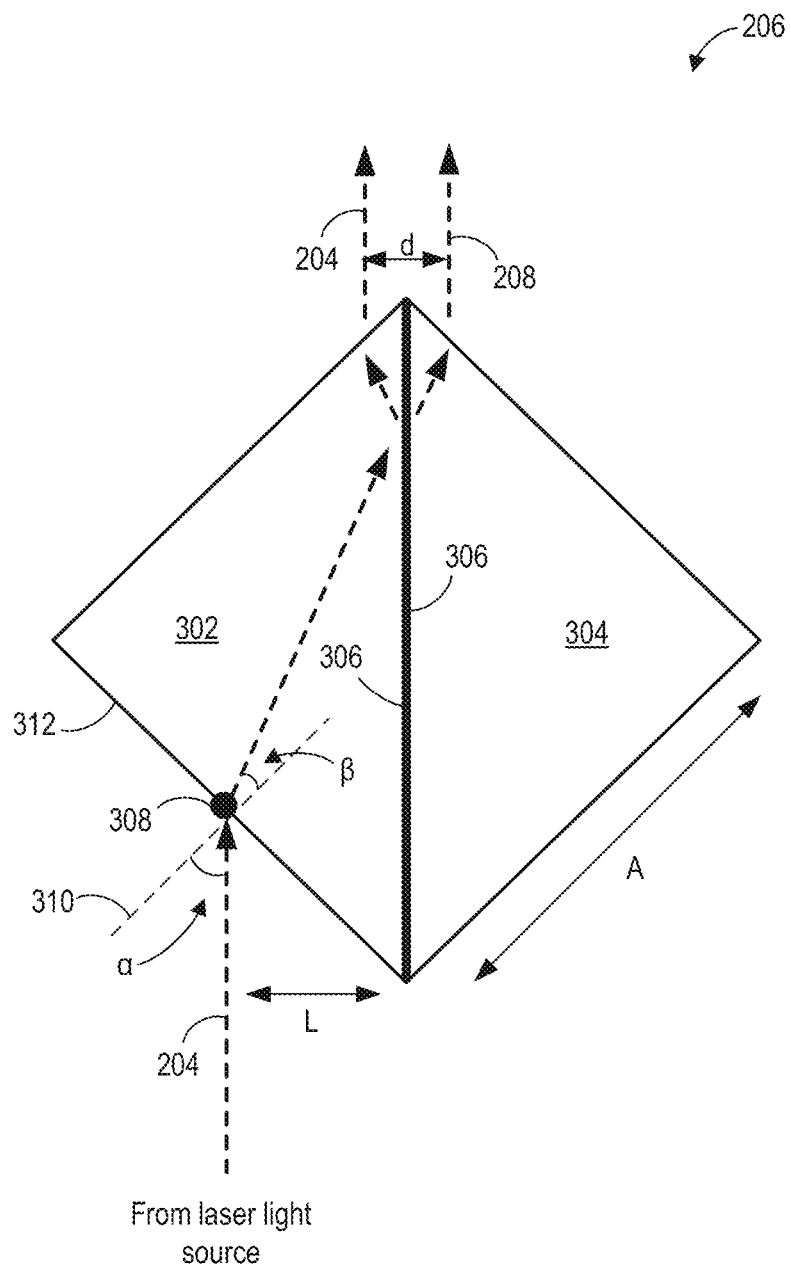
FIG. 3 shows a first example of a beamsplitting device which may be used to generate the pair of mirrored laser beams of the auto-focus system of FIG. 2.
Figure 4:
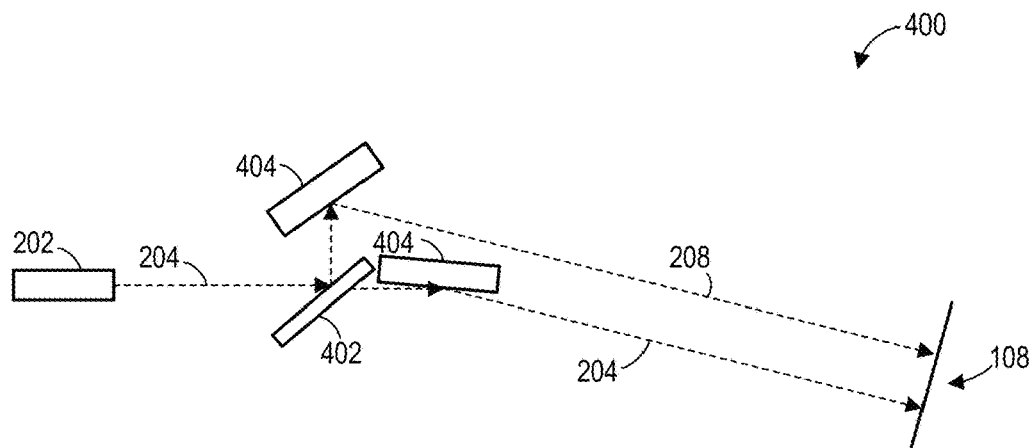
FIG. 4 shows a second example of a beamsplitting device which may be used to generate the pair of mirrored laser beams of FIG. 2.
Figure 5:
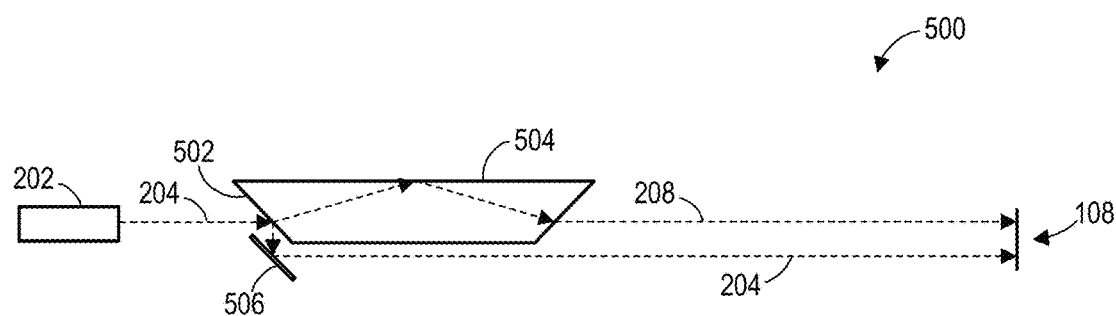
FIG. 5 shows a third example of a beamsplitting device which may be used to generate the pair of mirrored laser beams of FIG. 2.
Figure 6:
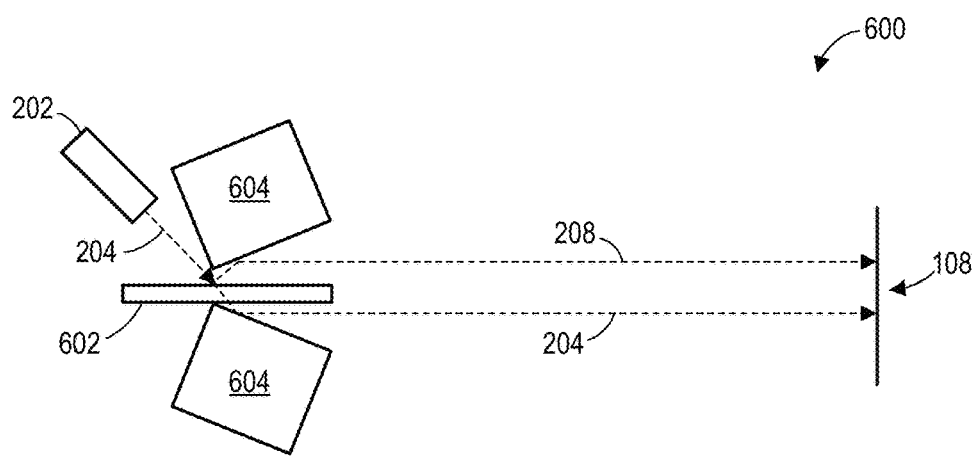
FIG. 6 shows a fourth example of a beamsplitting device which may be used to generate the pair of mirrored laser beams of FIG. 2.
Figure 7:
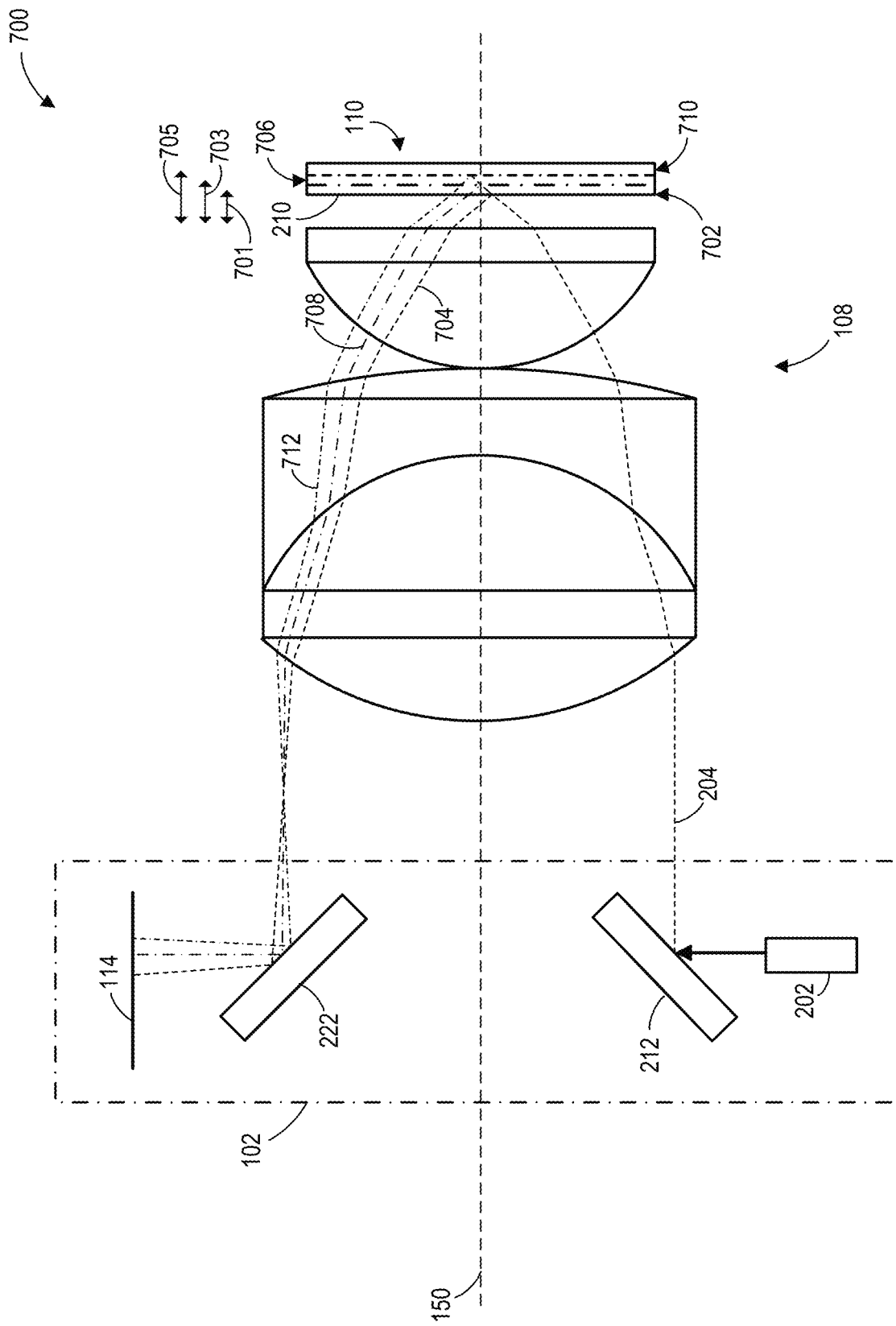
FIG. 7 shows an effect of sample position on reflection of the interrogation beam for the auto-focus system of FIG. 2.
Figure 8:
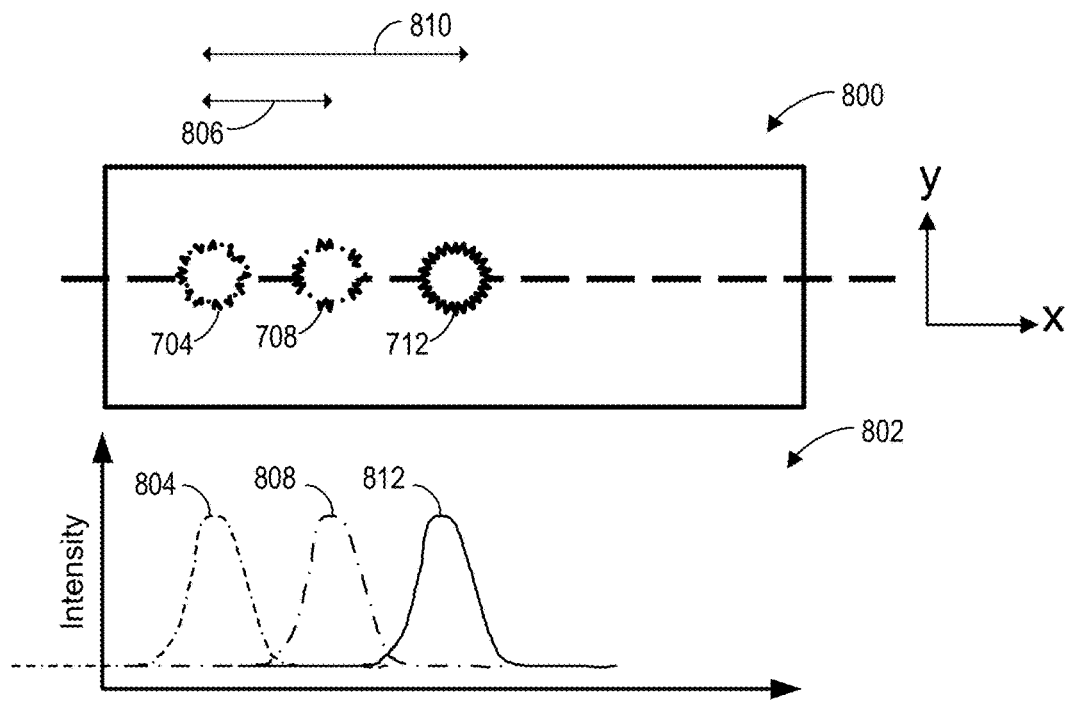
FIG. 8 shows examples of a two-dimensional detector array and a one-dimensional spectral profile for an interrogation beam at a detector of the auto-focus system of FIG. 2.
Figure 9:
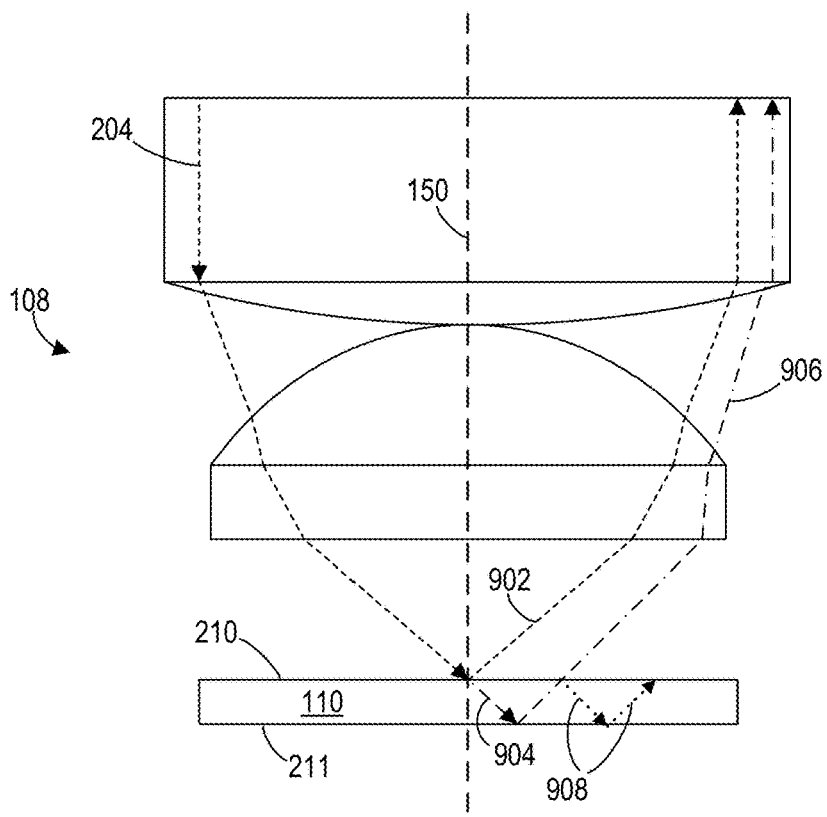
FIG. 9 shows a detailed view of a path of an interrogation beam through a microscope objective.
Figure 10:
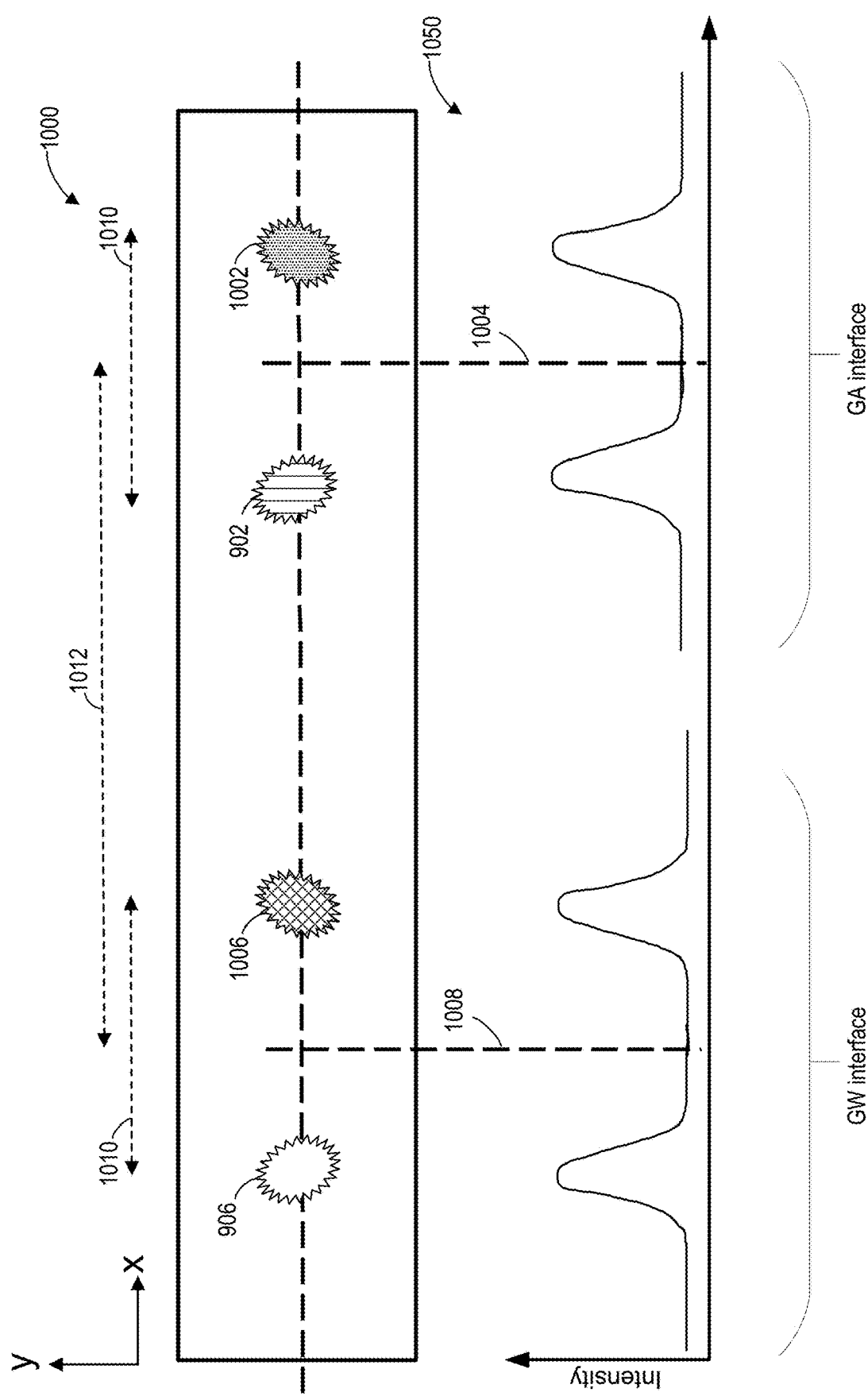
FIG. 10 shows an example of a two-dimensional detector array and a one-dimensional spectral profile for the pair of mirrored laser beams of the auto-focus system of FIG. 2.
Figure 12:
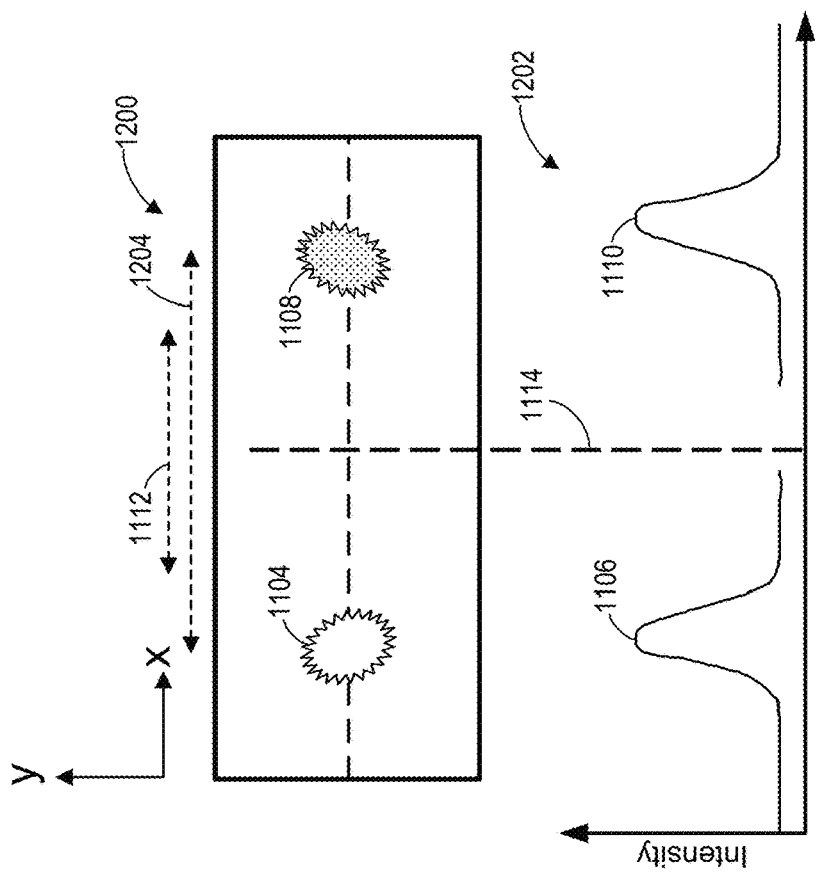
FIG. 12 shows an effect of variation in launch angle of the pair of mirrored laser beams on the two-dimensional detector array and the one-dimensional spectral profile of FIG. 11.
Figure 11:
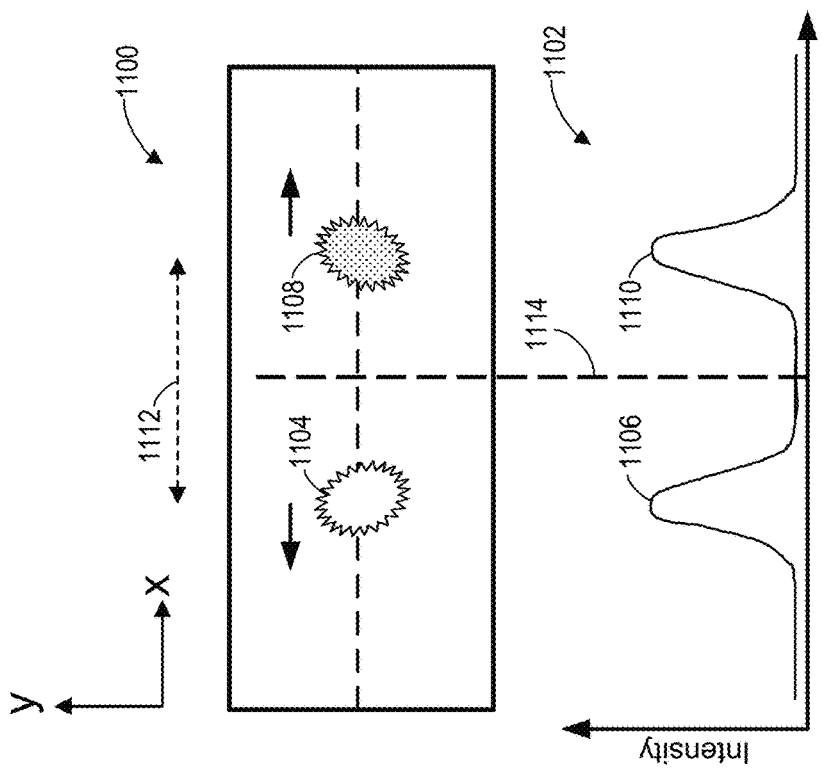
FIG. 11 shows an example of a two-dimensional detector array and a one-dimensional spectral profile depicting reflection of the pair of mirrored laser beams from a glass-air interface of a sample.
Figure 13:
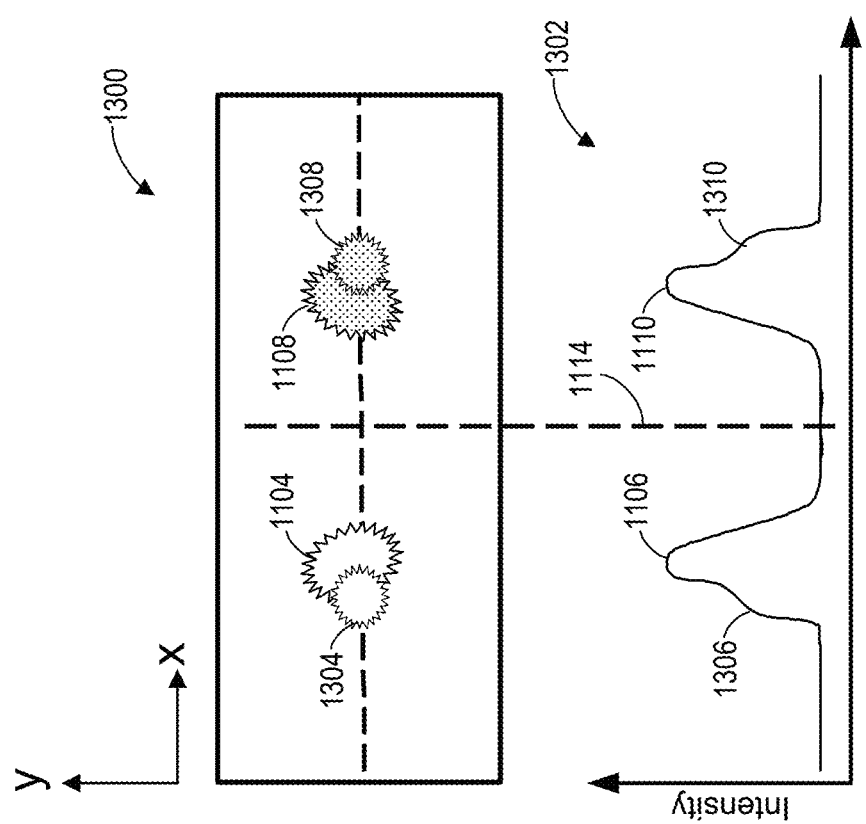
FIG. 13 shows an effect of variation in beam shape on the two-dimensional detector array and the one-dimensional spectral profile of FIG. 11.
Figure 15:
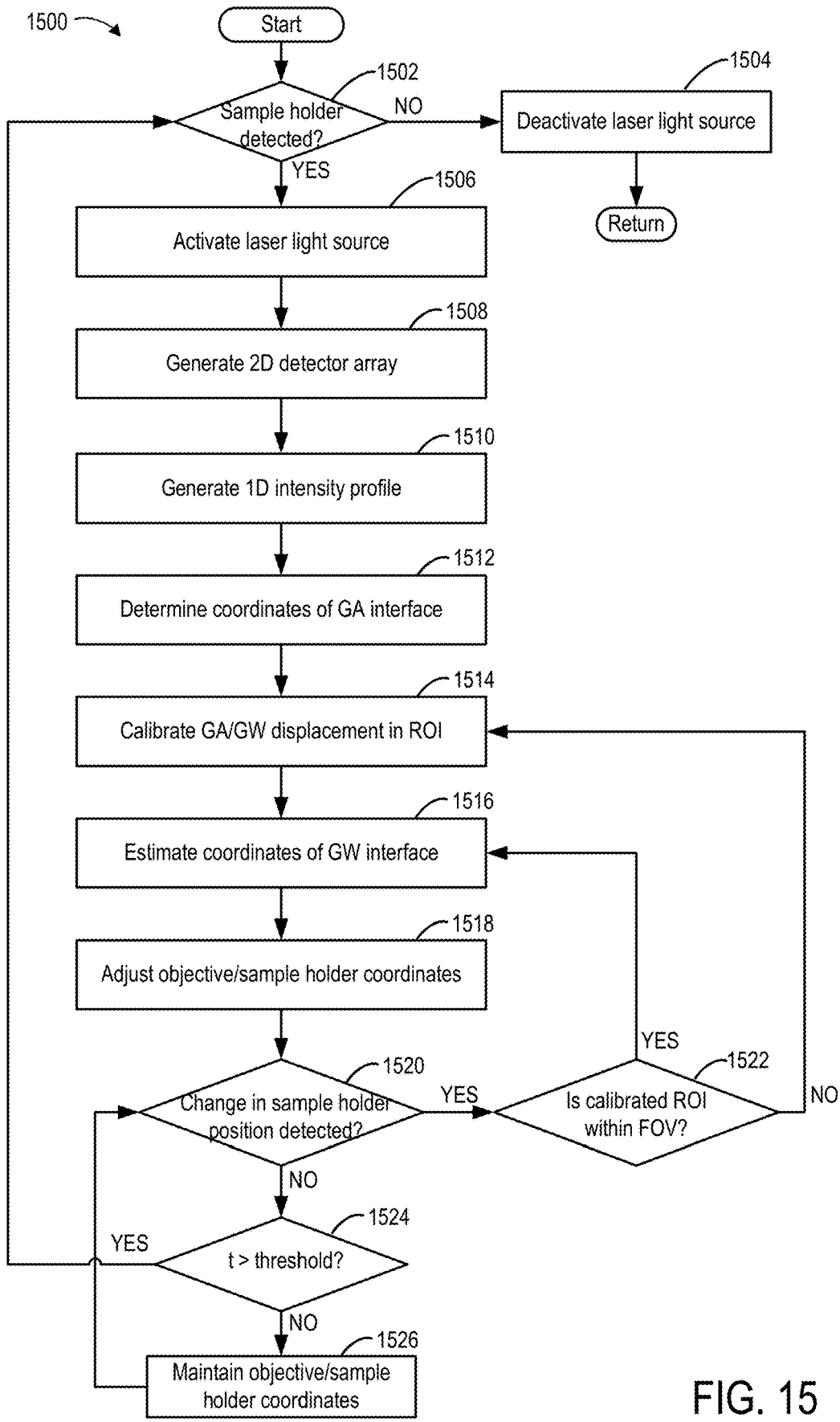
FIG. 15 shows an example of a method for aligning a microscope focus with a target focal plane using the auto-focus system of FIG. 2.

The following description relates to systems and methods for a microscope auto-focus system. A simplified, block diagram of an auto-focus system for a microscope is depicted in FIG. 1. In order to reduce a number of components of the auto-focus system, and an overall size and cost of the microscope, the auto-focus system may rely on a pair of mirrored interrogation beams for aligning the microscope focus. FIG. 2 shows an example of an auto-focus system with a beamsplitting device for generating the pair of mirrored beams. Various types of beamsplitting devices are possible, including a cube beamsplitter, as shown in FIG. 3. FIGS. 4-6 illustrate alternative examples of beamsplitting devices, all of which may include a greater number of components and complexity than the cube beamsplitter. A position of an objective of the microscope may be triangulated based on variations in reflection of an interrogation light beam, as depicted in FIG. 7 which shows the auto-focus system of FIG. 2 with one of the pair of mirrored interrogation beams for brevity. A detector view of a two-dimensional array and a corresponding one-dimensional spectral profile based on the variations in reflection of the light beam are illustrated in FIG. 8. Furthermore, the interrogation light beam may be reflected at more than one surface of a sample (e.g., a slide), as shown in FIG. 9. As a result, more than one set of laser spots, each set representing reflection at a surface of the sample, may be observed at the detector, as shown in FIG. 10. As depicted in FIGS. 11-13, variations in launch angle and beam shape may be detected at the detector but a location of a centroid, the centroid an averaged location based on the pair of mirrored beams, may remain consistent in spite of the variations. A relative stability of centroid over time is illustrated in a graph comparing fluctuations, in pixels, of the centroid and each of the pair of mirrored beams. A method for operating the auto-focus system is shown in FIG. 15.

In addition to an illumination system for a microscope, e.g., a light source and optical elements for directing incident light to a sample or specimen, a microscope assembly may also include an auto-focus system for automatically aligning a focus of the microscope objective with a target focal plane of a sample to be imaged. For example, a simplified block diagram of an auto-focus system 100 for a microscope is depicted in FIG. 1. In one example, the microscope may be an infinity-corrected microscope, where an image distance of the microscope is set to infinity. In the infinity-corrected microscopy, an intermediate image is formed at a tube lens rather than at an objective lens, allowing addition of components into an illumination light beam path without altering the focus of the microscope. The tube lens is spaced away from the objective and a collimating space is provided between the tube lens and the objective.

In some examples, the microscope may be a bright-field imaging microscope where illumination of the sample is provided from below the sample. In such instances, the microscope may include a condenser lens configured to focus illumination light from a light source below the sample onto the sample. The objective is therefore arranged on an opposite side of the sample from the condenser lens.

An interrogation light beam, used to align the microscope focus with the target focal plane or region of the sample, may be introduced in the collimating space, as described further below. An illumination system of the microscope of FIG. 1 is omitted for brevity but it is to be understood that the auto-focus system 100 may be used in conjunction with the illumination system, thereby providing synchronous illumination of the sample both with incident light and the interrogation light beam.

The auto-focus system 100 includes an auto-focus sensor 102 which may house a variety of optical components, some of which are depicted in FIG. 1 while some are omitted for brevity. For example, the auto-focus sensor 102 may include a light source 103 configured to produce an interrogation light beam 104, one or more mirrors for reflecting and directing the interrogation light beam 104, one or more lenses for collimating the interrogation light beam 104, a beamsplitter for splitting the interrogation light beam 104 into at least two beams, etc. It will be appreciated the auto-focus sensor 102 may include additional components not described herein.

The interrogation light beam 104 may include a first portion 104a, hereafter an incident interrogation light beam 104a, and a second portion 104b, hereafter a reflected interrogation light beam 104b. The incident interrogation light beam 104a may be directed to an optical train 106 of the microscope within a collimating space of the microscope, e.g., in between a tube lens (not shown) and an objective 108. In some examples, the microscope may be used for quantitative optical analysis, such as fluorescence microscopy, and the optical train 106 may include various filters to control which wavelengths of light travel through the objective 108 of the microscope. In other examples, the microscope may be configured to provide non-quantitative, optical images of a sample 110 and the various filters may not be implemented. Regardless of the application, the optical train 106 includes at least one mirror 112 for deflecting the interrogation light beam 104 to the objective 108. The optical train 106 may also include the tube lens which forms an intermediate image of the sample 110 at an image plane, e.g., at an eyepiece, of the microscope.

At the objective 108, the incident interrogation light beam 104a may be focused and directed to the sample 110 at which the incident interrogation light beam 104a is reflected. Reflection of the incident interrogation light beam 104a, e.g., generation of the reflected interrogation light beam 104b, may occur at one or more interfaces of the sample 110, described further below. The reflected interrogation light beam 104b may travel through the optical train 106 of the microscope and project onto a detector 114 of the auto-focus sensor 102. In one example, the detector 114 may be a charge coupled device (CCD) sensor configured to convert light into a digital signal.

The digital signal generated at the detector 114 may be sent to a controller 116 that is electronically coupled to the detector 114 and to a device 118 for adjusting a position of the objective 108 relative to the sample 110. For example, the device 118 may be a motor that translates the objective 108 along an axis 150 of the optical train 106 of the microscope such that a distance 120 between the objective 108 and the sample 110 is varied. The controller 116 receives the digital signal from the detector 114 and evaluates an alignment of the microscope focus, and therefore the position of the objective 108, based on an image generated based on the digital signal. The controller 116 may use the image to guide adjustment of the objective position via the device 118 until the focus is determined to be aligned with the target focal plane or region. As such, the auto-focus sensor 102 provides continuous feedback for triangulating and re-positioning the objective 108 in response to changes in the sample 110. For example, the sample 110 may be shifted along a plane perpendicular to the axis 150 of the optical train 106 which may change a depth of the target focal plane or region. The auto-focus sensor 102 enables detection of the change and modification of the microscope focus in response to the change.

The controller 116 may be a computer, including various components such as a processor, input/output ports, an electronic storage medium for executable programs and calibration values, random access memory, a data bus, etc. The electronic storage medium can be programmed with computer readable data representing instructions executable by the processor for performing the methods described herein as well as other variants that are anticipated but not specifically listed. The controller 116 may be coupled to various accessory devices including input devices such as a keyboard, a mouse, etc.

The controller 116 may be communicatively coupled to various components of the microscope. For example, the controller 116 may be configured to command activation/deactivation of a light source of the illumination system as well as the light source generating the interrogation light beam 104 when prompted based on user input or based on detection of a presence of the sample 110. As another example, the controller 116 may instruct adjustment of the position of the sample 110 to focus the incident light and the interrogation light beam 104 on a different region of the sample 110. For example, the controller 116 may command actuation of the motor 118 coupled to a sample holder to vary the position of the sample holder with respect to the objective 108. In some examples, a position sensor may monitor the position of the sample 110 and may be communicatively coupled to the controller 116 to relay the sample position to the controller 116.

The digital signal produced by the detector 114 may be processed by the controller 116 and displayed at an interface, such as a computer monitor. It will be appreciated that the controller 116 may be further coupled to other sensors and actuators of the microscope. In one example, communication between the controller 116 and the sensors and actuators of the microscope may be enabled by various electronic cables, e.g., hardwiring. In other examples, the controller 116 may communicate with the sensors and actuators via a wireless protocol, such as Wifi, Bluetooth, Long Term Evolution (LTE), etc.

As depicted on FIG. 1, introduction of the incident interrogation light beam into the optical train of the microscope may rely on at least one mirror (e.g., the mirror 112) to direct the incident interrogation light beam to the objective. The incident interrogation light beam may travel through the objective biased along a first side of the objective and the reflected interrogation light beam may return through the objective biased along a second, opposite side of the objective. Passage of the incident interrogation light beam through the first side of the objective may be symmetric with passage of the reflected interrogation light beam through the side of the objective about the axis 150.

In some examples, the light source of the interrogation light beam may be a light-emitting diode (LED) and in some instances, the incident interrogation light beam may be collimated by a lens before reaching the objective. A waist, e.g., a spread of a cross-sectional area of the interrogation light beam, includes both a diameter of the incident interrogation light beam and a diameter of the reflected interrogation light beam which are offset from one another across the axis 150 of FIG. 1. As such, in order to accommodate reflection of both the portions of the interrogation light beam, the mirror, e.g., the mirror 112 of FIG. 1, may be sized to match the waist of the interrogation light beam. For example, the waist of the interrogation light beam may occupy an entire aperture of the optical train of the microscope. As a result, a footprint of the optical train of the microscope may be large, adding to a demand for space and a cost of the microscope.

The issues described above may be at least partially addressed by adapting the auto-focus system with low-cost laser diodes as the light source for the interrogation light beam. The laser diodes may include embedded collimating optics, therefore precluding the use of the separate collimating lens and simplifying the auto-focus sensor. Furthermore, the incident (and reflected) interrogation light beam generated by the laser diodes may have a small diameter, such as less than 1 mm, for example. A waist of the laser diode-generated interrogation light beam may therefore be reduced relative to a conventional interrogation light beam. Introduction of the incident interrogation light beam may be enabled by a mirror with reduced size, relative to the conventional mirror (e.g., mirror 112 of FIG. 1) and corresponding to the diameter of the incident light beam, and positioned at an edge of the aperture of the optical train of the microscope rather than in the aperture of the optical train, as shown in FIG. 2 and described below. The reflected interrogation light beam may be similarly directed to the detector by a mirror of reduced size and also positioned at an edge of the optical train aperture.

Implementation of the low-cost laser diodes may present new challenges with respect to the conventional laser, however. For example, in order to maintain costs low, the laser diodes may not include mechanisms for electrical and temperature stabilization. Electrical and temperature variability may drive fluctuations in a shape and a launch angle, e.g., an angle at which the interrogation beam leaves the laser diodes. The fluctuations may degrade a triangulation accuracy of the auto-focus system.

In one example, in order to mitigate effects of electrical and temperature instability, the auto-focus system may be configured to generate an optically flipped beam, e.g., a secondary beam where the incident interrogation light beam emitted by the laser diodes is a primary beam. The secondary beam may be generated by splitting the primary beam which may be achieved using various mechanisms described further below with reference to FIGS. 2-6. The secondary beam may be a reflection of the primary beam, having a mirrored symmetry and shape relative to the primary beam. In other words, a mirror plane is present along an axis extending between the primary beam and secondary beam. A centroid, e.g., plane of symmetry, of the beams is positioned at the mirror plane and is also symmetric about the mirror plane and may therefore account for changes to a shape of the primary beam or variations in launch angle via a common mode rejection application. The common mode rejection application allows noise (e.g., fluctuations in the spatial and morphological characteristics of a laser beam), observed at each of the primary and secondary beams due to the mirror symmetry, to be cancelled. Details of the centroid and the common mode rejection application are provided further below.

An example of an auto-focus system 200 configured to generate a pair of mirror-symmetric incident interrogation light beams is depicted in FIG. 2. In one example, the auto-focus system 200 may be an embodiment of the auto-focus system 100 of FIG. 1, with the axis 150, the auto-focus sensor 102, the objective 108 of the optical train 106, the sample 110, as well as the detector 114, similarly labelled. The auto-focus sensor 102 may include an optically mirrored laser source 102 which is configured with a linearly polarized laser light source 202 in the auto-focus system 200 of FIG. 2. In one example, the laser light source 202 may be one or more laser diodes from which a primary beam 204 may be emitted. The primary beam 204 may be similar to the incident interrogation light beam 104a of FIG. 1.

Prior to introduction into the optical train 106 of the microscope, the primary beam 204 may pass through a cube beamsplitter 206, also included in the optically mirrored laser source 201, which splits the primary beam 204 such that a portion of the primary beam 204 forms a secondary beam 208. The cube beamsplitter 206 and the splitting of the primary beam 204 is shown in greater detail in FIG. 3. Therein, the cube beamsplitter 206 includes a first prism 302 and a second prism 304 coupled to one another along a slanted facet 306 of each of the prisms to form a monolithic structure. As an example, each of the first prism 302 and the second prism 304 may be a right-angle prism formed of glass, where the glass of both the first prism 302 and the second prism 304 may have a same index of refraction n. Surfaces of the slanted facets 306 may be coated with a polarization specific layer of material configured to provide at least partial reflection of the primary beam 204.

For example, as shown in FIG. 3, the cube beamsplitter 206 may be positioned in a path of the primary beam 204 with the slanted facets 306 of the first and second prisms 302, 304 oriented parallel with the primary beam 204. As the primary beam 204 strikes the cube beamsplitter 206 at an entry point 308 along the first prism 302, the primary beam 204 may be refracted. For example, the primary beam 204 may enter the first prism 302 at a first angle α relative to a plane 310 normal to a surface of the first prism 302. In one example, the first angle α may be 45 degrees. Upon refraction at the surface, the primary beam 204 may continue through the first prism 302 at a second angle β relative to the plane 310, where the second angle β is different from the first angle α. The refraction causes the primary beam 204 to bend toward the slanted facets 306 of the first and second prisms 302, 304 within the first prism 302.

At the slanted facets 306, a first portion of the primary beam 204 is reflected and a second portion of the primary beam 204 is transmitted as a mirror image of the first portion. Hereafter, the first portion is a continuation of the primary beam 204, e.g., the first portion has the same symmetry as the primary beam 204, and the second portion is the secondary beam 208. Reflection of the first portion (e.g., the primary beam 204) and transmission of the second portion (e.g., the secondary beam 208) at the slanted facets 306 causes the beams to continue travelling through the first prism 302 and the second prism 304, respectively, in diverging directions away from the slanted facets 306. Upon exiting the cube beamsplitter 206, each of the primary beam 204 and the secondary beam 208 are refracted to become aligned with the direction of the primary beam 204 prior to entering the cube beamsplitter 206. In other words, the primary beam 204 and the secondary beam 208 are aligned parallel with one another, and with the slanted facets 306 of the cube beamsplitter 206, outside of the cube beamsplitter 206.

A power distribution between the primary beam 204 and the secondary beam 208 may be adjusted to be similar by rotating a polarization of the primary beam 204 at the linearly polarized laser light source 202 of FIG. 2. As a result, a similar exposure time and intensity of the beams may be resolved at the detector 114. A distance d, as shown in FIG. 3, between the primary beam 204 and the secondary beam 208 when the beams exit the cube beamsplitter 206 may be modified by varying a position of the entry point 308 of the primary beam 204 upon entering the cube beamsplitter 206. For example, the entry point 308 may be shifted along an entry facet 312 which may modify the distance d based on the condition $$L \approx \frac{\sqrt{2}A}{1 + \tan\left[\frac{\pi}{4} + \sin^{-1}\left(\frac{1}{\sqrt{2}n}\right)\right]}$$

where L is a distance between the entry point 308 and the slanted facets 306 of the cube beamsplitter 206, A is an area of the cube beamsplitter 206, and n is the refractive index of the glass of the first and second prisms 302, 304. As L decreases, the distance d between the primary beam 204 and the secondary beam 208 may increase.

The cube beamsplitter 206 may be a compact and monolithic structure to split an interrogation laser light beam into a pair of mirror symmetric beams. Adjustment of the distance between the pair of beams is readily controlled by adjusting the entry point of the primary beam at the cube beamsplitter surface. However, other techniques for splitting the primary beam may be used. Examples of alternate devices and mechanisms for splitting the primary beam are illustrated in FIGS. 4-6.

As shown in FIG. 4, a first alternate device 400 includes directing the primary beam 204 to a beamsplitting lens 402 to reflect the second portion of the beam (e.g., the secondary beam 208) and transmit the first portion of the beam. The secondary beam 208 is thereby generated as a mirror image of the primary beam 204. Each of the pair of beams are further reflected, at one of a pair of mirrors 404 which directs the pair of beams to the objective 108.

A second alternate device 500 is depicted in FIG. 5 which includes directing the primary beam 204 from the laser light source 202 to a front surface 502 of a dove prism 504. The front surface 502 may be configured with a coating to reflect the first portion of the primary beam 204 and transmit the second portion. The secondary beam 208 enters the dove prism 504 and is reflected within the dove prism 504, thus modified to be a mirror image of the primary beam 204. Upon exiting the dove prism 504, the secondary beam 208 is refracted to become aligned parallel with primary beam 204. The reflected primary beam 204 is further reflected by a mirror 506 oriented at a 45 degree angle relative to the reflected primary beam 204 to direct the primary beam 204 to the objective 108.

A third alternate technique 600 is shown in FIG. 6, which includes directing the primary beam 204 to a beamsplitting lens 602 where the first portion of the primary beam 204 is transmitted and the second portion of the primary beam 204 is reflected to generate the secondary beam 208. Each of the pair of beams are deflected by one of a set of mirrors 604 and directed to the objective 108.

While each of the devices shown in FIGS. 4-6 provides effective splitting of the primary beam into a pair of mirrored beams, multiple components are included in each example to enable the splitting and direction of the pair of beams to the objective. Each of the components may demand a specific position and alignment which may increase manufacturing costs. Furthermore, a minimum distance between the primary beam and the secondary beam may be constrained by a size of the components which may degrade a capability of a common mode rejection application to stabilize a focus of the microscope. Additionally, adjustment of power distribution between the primary and secondary beams may be difficult to control in the alternate devices of FIGS. 4-6. Thus, implementation of the cube beamsplitter, as shown in FIGS. 2-3, may be a preferred mechanism for generating mirrored beams.

As such, splitting of the primary beam 204 may be readily achieved and adjusted by the cube beamsplitter 206. Rotation of the laser light source allows the polarization to be varied until the primary beam 204 and the secondary beam 208 reach similar brightness in a projected image at the detector 114, as shown in FIG. 2. As described above and further depicted in FIG. 2, the pair of beams (e.g., the primary beam 204 and the secondary beam 208), may be reflected by a first mirror 212 with smaller dimensions than a conventional mirror (e.g., a dichroic mirror). The first mirror 212, as described above, may be located at an edge of the aperture of the optical train 106, within the auto-focus sensor 102, and may be oriented at an angle to direct reflection of the pair of beams to the objective 108 along a path parallel to the axis 150. In one example, a position of the first mirror 212 may be substantially aligned with a first side 214 of the objective 108 along a direction parallel with the axis 150. The distance d (as indicated in FIG. 3) between the pair of beams is maintained as the pair of beams enter the objective 108 along the first side 214 of the objective 108.

The objective 108 includes a plurality of lenses 216 aligned in parallel along the axis 150. As the pair of beams travel through each of the plurality of lenses 216, the pair of beams may be refracted, gradually decreasing the distance between the pair of beams until the pair of beams converge and illuminate a surface of the sample 110 at a focal point 218. At the focal point 218, the pair of beams are reflected and pass through the objective 108 along a second side 220 of the objective, opposite of the first side 214. As the pair of beams travel through the objective 108 in an opposite direction from passage of the pair of beams along the first side 214 of the objective 108, e.g., away from the sample 110, the pair of beams are similarly refracted by the plurality of lenses 216 of the objective 108. The distance between the pair of beams gradually increases until the distance may be similar to the distance d (as indicated in FIG. 3).

It will be appreciated that while reflection of the pair of beams is illustrated to occur at a first surface 210 of the sample 110, which may be a glass-air (GA) interface of the sample 110, at least a portion of the pair of beams may be transmitted through a material of the sample (e.g., glass) to be reflected off a second surface 211 of the sample 110, which may be a glass-water (GW) interface of the sample 110. For clarity, a path of the pair of beams upon reflection from the second surface 211 is omitted in FIG. 2 but will be described further below.

When the pair of beams exit the objective 108, the distance d between the pair of beams is resumed. Furthermore, the pair of beams continue out of the objective 108 along a path that is parallel to the path of the pair of beams between the first mirror 212 and the first side 214 of the objective 108 and parallel to the axis 150. The pair of beams may be reflected at a second mirror 222 positioned to be substantially aligned with the second side 220 of the objective along a direction parallel with the axis 150. Similar to the first mirror 212, the second mirror 222 may be included in the auto-focus sensor 102 and may be smaller in size than a conventional dichroic mirror used in the optical train 106 to reflect an interrogation light beam. The second mirror 222 may be positioned at an edge of the aperture of the optical train 106, opposite of the first mirror 212 and oriented at an angle that directs the reflected pair of beams to the detector 114.

At the detector 114, each beam may be projected as a laser spot in a two-dimensional (e.g., along x- and y-axes) array. For example, an embodiment of an auto-focus system 700 is depicted in FIG. 7. The auto-focus system 700 may be similar to the auto-focus system 200 of FIG. 2 but with the cube beamsplitter omitted for brevity. The path of the primary beam 204 is traced through the objective 108 to the sample 110. When the sample 110 is in a first position 702, a first reflected beam 704 is generated via reflection and directed to the detector 114 through the objective 108, as described above.

In some instances, a position of the sample 110 may vary along the axis 150. For example, the sample 110 may be a glass slide with variable thickness. At the first position 702, the first surface 210 of the sample 110 may be spaced away from the objective 108 by a first distance 701. Repositioning of the sample 110 along the plane perpendicular to the axis 150 or substitution with a new sample may cause the sample 110 to shift along the axis 150. For example, the sample 110 may be shifted to a second position 706 which may increase a spacing between the objective 108 and the first surface 210 of the sample 110 to a second distance 703 that is greater than the first distance 701.

Reflection of the primary beam 204 from the sample 110 at the second position 706 generates a second reflected beam 708 that is delivered to the detector 114 via a path that is offset from a path of the first reflected beam 704. Increased shifting of the sample 110 away from the objective 108 to a third position 710 at a third distance 705 may result in a third reflected beam 712 that is offset from each of the first and second reflected beams 704, 708. The offset of each reflected beam according to sample position along the axis 150 may be observed at an image projected by the detector.

As shown in FIG. 8, a detector view 800 is depicted above a one-dimensional (1D) intensity profile 802, illustrating the image projected by the detector based on illumination by one of the reflected beams. The projected image may be a two-dimensional (2D) detector array and the first reflected beam 704 may be observed as a laser spot on the 2D array relative to an x-axis and a y-axis. An intensity of the first reflected beam 704 may be plotted in the 1D intensity profile 802, shown as a first peak 804. The first peak 804 (and all other peaks of the 1D representation) may be generated by accumulating pixel values of a column in the 2D detector array at which the laser spot is located. The position of the sample 110 along the axis 150 of FIG. 7 may correspond to a position of the laser spot along the x-axis of the 2D detector array and changes to the sample 110 along the axis 150 are thereby depicted as changes in the laser spot position along the x-axis of the 2D detector array.

For example, adjustment of the sample 110 to the second position 706 of FIG. 7 results in formation of a laser spot representing the second reflected beam 708 to the right of the first reflected beam 704 in the detector view 800. A distance 806 between the first reflected beam 704 and the second reflected beam 708 in the detector view 800 may correspond to a difference between the first distance 701 and the second distance 703 of FIG. 7. The distance 806 is also present between the first peak 804 and a second peak 808, the second peak 808 depicting an intensity of the second reflected beam 708, in the 1D intensity profile.

Adjustment of the sample 110 to the third position 710 of FIG. 7, may shift the laser spot of the third reflected beam 712 to the right of the second reflected beam 708. A distance 810 between the laser spot of the first reflected beam 704 and the laser spot of the third reflected beam 712 along the x-axis of the 2D detector array may correspond to a difference between the first distance 701 and the third distance 705 of FIG. 7. The distance 810 is also present between the first peak 804 and a third peak 812, the third peak 812 depicting an intensity of the third reflected beam 712, in the 1D intensity profile.

A position of the sample slide (e.g., the sample 110) along a longitudinal axis of the microscope (e.g., the axis 150) may therefore be inferred and monitored based on changes in the position of the laser spot in the 2D detector array along the x-axis. In a well-aligned microscope, shifts along the y-axis in the detector view, such as FIG. 8, are not observed.

As described above, the primary beam may be reflected from more than one surface of the sample. As one example, as shown in FIG. 9, the primary beam 204 may be reflected at the first surface 210 (e.g., the GA interface) of the sample 110, resulting in a first reflected beam 902, or GA beam 902. It will be appreciated that a secondary beam, such as the secondary beam 208 of FIG. 2, may follow a similar path as the primary beam 204, which may also be reflected at the first surface 210 of the sample 110 but is omitted in FIG. 9 for clarity. At least a portion 904 of the primary beam 204 (and of the secondary beam), however, may be transmitted through the sample 110 to be reflected at the second surface 211 (e.g., the GW interface) of the sample 110.

The GA interface may be a boundary between the material of the sample 110 (e.g., glass, plastic, etc.) and air surrounding the sample 110 while the GW interface may be a boundary between the material of the sample 110 and a specimen. The specimen may be a liquid in direct contact with the second surface 211 of the sample 110. It will be appreciated, however, that other examples may include specimens in a solid phase or mixed phases and reference to a glass-water interface is representative of a variety of interface types, such as an interface between the glass and a solid phase specimen.

Reflection of the transmitted portion 904 of the primary beam 204 at the second surface 211 may form a second reflected beam 906, or GW beam 906, that passes through the objective 108 and is directed to the detector, offset from the first reflected beam. At the detector, an image projected as the 2D detector array, based on illumination by the reflected beams, may be used to identify which laser spots are attributable to the GA interface versus the GW interface, thus allowing the microscope to be focused at a target interface.

For example, as shown in FIG. 10, a detector view 1000, based on the 2D detector array, is shown above a 1D intensity profile 1050. The detector view 1000 includes a laser spot for the GA beam 902 and a laser spot for the GW beam 906 of FIG. 9. The GW beam 906 is positioned to the left of the GA beam 902 in the detector view 1000. The 2D detector array for the GA beam 902 includes a secondary reflected beam 1002 formed by a secondary beam that is split from the primary beam 204 (e.g., the secondary beam 208 of FIG. 2) and reflected at the GA interface. A first centroid 1004 of the first reflected beam 902 and the corresponding secondary reflected beam 1002 is indicated by a dashed line. The first centroid 1004 may be determined based on peaks corresponding to the laser spots in the 1D intensity profile 1050. The 2D detector array for the GW beam 906 similarly includes a secondary reflected beam 1006 formed by reflection of the secondary beam at the GW interface. A second centroid 1008 of the second reflected beam 906 and the corresponding secondary reflected beam 1006 is indicated by a dashed line, the second centroid 1008 determined based on peaks corresponding to the laser spots in the 1D intensity profile 1050.

A spread 1010 of each pair of laser spots may be smaller than a distance 1012 between the first centroid 1004 and the second centroid 1008. As such, the spread 1010 of the laser spots reflected at the GA interface does not overlap with the spread 1010 of the laser spots reflected at the GW interface. Reflection of the primary and secondary beams at the GA interface may thereby be readily differentiated from reflection of the primary and secondary beams at the GW interface. For example, a controller, such as the controller 116 of FIG. 1, may be implemented with a detection algorithm configured to determine peak locations and peak widths from the 1D intensity profile to compute locations of the first and second centroids 1004, 1008. From the inferred centroids, which may be optical encoders of axial coordinates of the sample (e.g., relative to the longitudinal axis), the locations of the GA and GW interfaces may be estimated. By tracking a location of the centroid for each of the interfaces, the microscope focus can be tracked and maintained aligned with the target focal plane or region as the sample is scanned, as described further below.

As the GW interface is the boundary between the material of the sample and the specimen to be imaged, the GW interface may be the target focal plane for the microscope. Separation of the GA laser spots from the GW laser spots may allow the GW to be tracked for microscope focal alignment. However, in some instances, as indicated by arrows 908 in FIG. 9, the primary beam 204 may be reflected internally, within the sample 110 and between the first surface 210 and the second surface 211. The internal reflection may generate multiple reflected beams and at least a portion of the reflected beams may reach the detector, causing formation of multiple laser spots for the GW interface. Furthermore, the internally reflected beams may be affected by a morphology of the specimen at the GW interface which results in interference with peak detection. As an example, the specimen may be a biological specimen with a morphology that interacts with the beam energy and causes the corresponding laser spot at the 2D detector array to be speckled. The peaks representing the speckled laser spot in the 1D intensity profile may be distorted which may cause difficulty in peak identification.

In one example, the auto-focus system described herein may rely on tracking the GA interface to monitor and maintain the microscope focus. As such, the system may be referred to as a glass-air interface laser auto-focus (GA-LAF) system. In examples where a thickness of the sample, e.g., of a glass slide, where the thickness is defined along the axis 150 of FIGS. 1, 2, 7 and 9, is uniform across the sample, the GW interface may be inferred based on the GA interface. For example, the GA interface may be monitored based on the laser spots of the 2D detector array and corresponding peaks in the 1D intensity profile and the GW interface location may be estimated by summing a fixed amount of displacement.

In other examples where the thickness of the sample is not uniform across the sample, the sample may have monotonic 2D variation. The variation in the thickness may be interpolated using initial calibration measurements. For example, a rectangular region of interest (ROI) of the sample may be selected and displacements at each corner of the ROI may be measured during calibration. The GW interface at any point within the ROI may be tracked using the GA-LAF system and summing an interpolated displacement. The interpolated displacement may be estimated during calibration by determining a discrepancy between averaged centroid coordinates, as inferred by the GA-LAF system, when the sample is positioned at a true focused plane. Multiple imaged-based focusing planes may be used for calibration. While use of the GA-LAF system to monitor the GW interface via the method described above may be slow due to a demand for scanning across various axial coordinates, the slowness may be offset by a tolerance of the method for relying on relatively few measurements. In other examples, however, calibration schemes utilizing more points than the four corners of the ROI may increase an accuracy of the displacement estimation although longer scanning times may be needed.

By relying on the centroid of the mirrored reflected beams for aligning the microscope focus, the auto-focus system may also accommodate fluctuations in the launch angle of the laser beam and in the shape of the beam. For example, the fluctuations may be invalidated via a common mode rejection application. As described above, the launch angle is the angle between the laser beam propagation direction and a front facet of a lasing device. In order to maintain costs low, the laser light source of the auto-focus system (e.g., the laser light source 202 of FIGS. 2 and 7) may not include any temperature or electrical stabilizing mechanisms which may lead to short-term and/or long-term variability. Short-term variations may contribute to oscillation of the microscope focus while long-term variations may lead to gradual loss of focus resulting from centroid drift when a single beam is used for focus alignment.

When the pair of mirrored beams is utilized instead, for example, when implementing the cube beamsplitter 206 of FIGS. 2-3, any changes to the primary beam is mirrored in the secondary beam. The centroid of the pair of beams is therefore unaffected by the fluctuations. For example, as shown in FIG. 11, a first detector view 1100 of a pair of mirrored beams is depicted above a first 1D intensity profile 1102 of the pair of mirrored beams. The pair of mirrored beams includes a laser spot in the first detector view 1100 representing a primary beam 1104, corresponding to a first peak 1106 in the first 1D intensity profile 1102, and a laser spot representing a secondary beam 1108, corresponding to a second peak 1110. The primary beam 1104 and the secondary beam 1108 may be similar to the primary beam 204 and the secondary beam 208 of FIG. 2. The primary beam 1104 is separated from the secondary beam 1108 (as well as the first peak 1106 from the second peak 1110) by a first distance 1112 and a centroid 1114 is indicated by a dashed line along the y-axis. The centroid 1114 may, for example, represent a position of GA interface of a sample along a longitudinal axis of a microscope optical train.

As shown in FIG. 12, a change in launch angle of the primary beam may be observed in a second detector view 1200 and a second 1D intensity profile 1202 of the primary beam 1104 and the secondary beam 1108. The different launch angle may increase a separation between the primary beam 1104 and the secondary beam 1108 to a second distance 1204 that is larger than the first distance 1112. A position of the centroid 1114 along the x-axis remains consistent with the centroid position in the first detector view 1100 of FIG. 11, however, due to an offsetting of the change in the primary beam location by the change in the secondary beam location.

A change in beam shape is depicted in FIG. 13. Therein, a third detector view 1300 shows the first primary beam 1104 and the secondary beam 1108 overlapped with laser spots of an altered primary beam 1304 and an altered secondary beam 1308, respectively. A third 1D intensity profile 1302 includes the first peak 1106 overlapped with an altered first peak 1306 and the second peak 1110 overlapped with an altered second peak 1310. The overlapped pairs of beams may be observed due to a multi-mode nature of the lasing device (e.g., the light source 202 of FIGS. 2 and 7), or to a diffraction effect of a laser output aperture which is used to reduce the laser beam waist and/or laser intensity, or to an interference effect caused by the optical elements in the beam path. As an example, the laser output aperture may be a pinhole used to reduce an intensity of the laser beam as well as the waist to decrease a likelihood or saturated at a detector of the auto-focus system. Such modification of the laser beam may result in diffraction at the laser beam output. The position of the centroid 1114, however, remains consistent with the centroid position of the first detector view 1100 of FIG. 11. Thus, the presence of such secondary morphological features on the beam profile does not interfere with the effectiveness of the auto-focusing.

Figure 14:
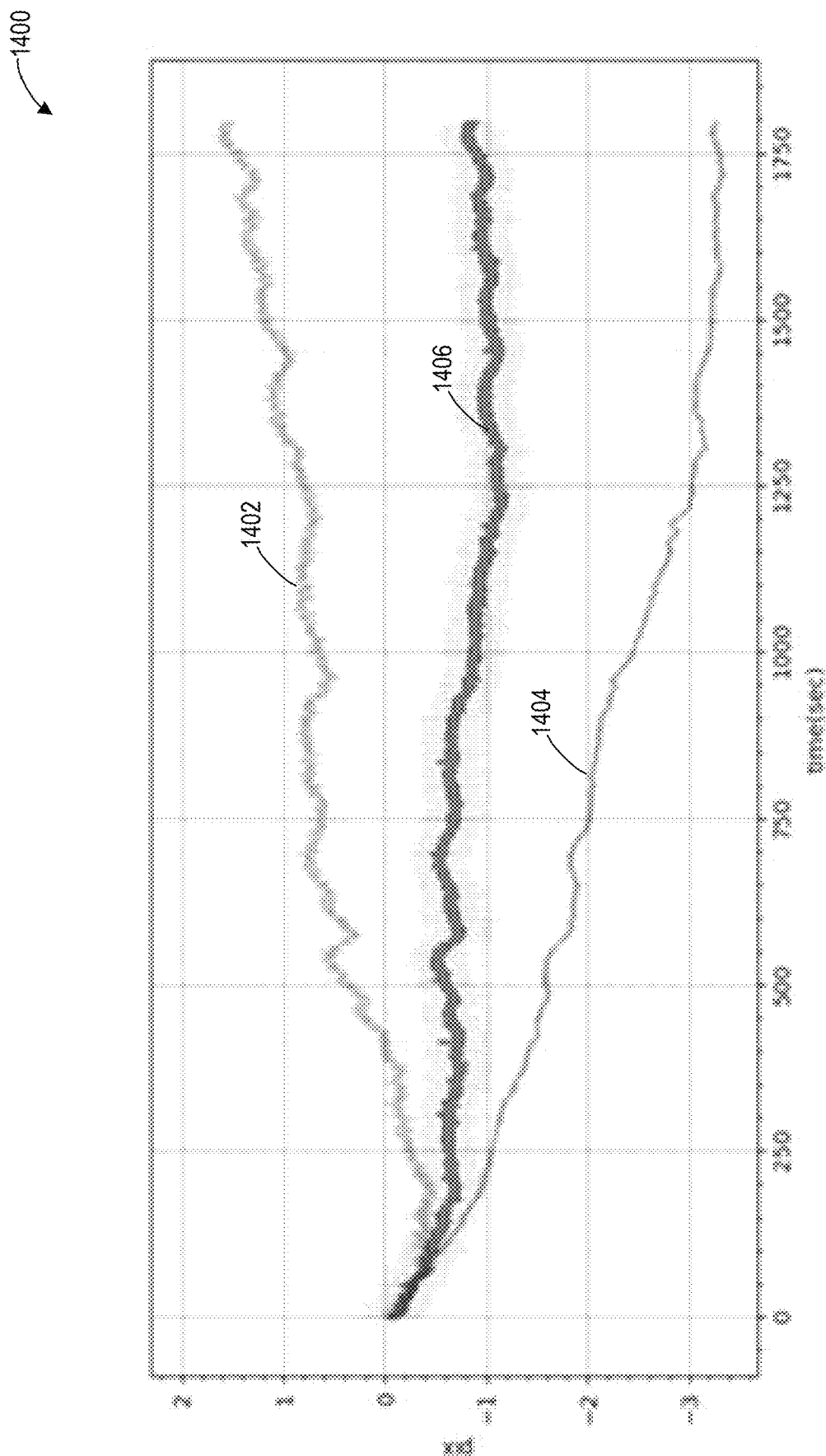
FIG. 14 shows a plot of pixel fluctuation in the pair of mirrored laser beams and an effect on a centroid generated based on the pair of mirrored laser beams over time.

As illustrated in FIGS. 11-13, the centroid position does not change in spite of fluctuations in launch angle and beam shape. Generation of the secondary beam offsets the fluctuations by providing a mirrored copy of the primary beam, including changes to the primary beam location and/or shape where the changes are incorporated in an opposite direction relative to the change in the primary beam. The common mode rejection application thereby increases triangulation accuracy by stabilizing the microscope focus against temperature and electrical variability without relying on additional components. A robustness of the common mode rejection application is illustrated in FIG. 14 in a graph 1400 plotting image pixels relative to time, where one pixel is approximately 200 nm.

Graph 1400 includes a first plot 1402 depicting a drift along a longitudinal axis of a microscopy optical train of a centroid based on a primary beam. A second plot 1404 depicts a drift of a centroid based on a secondary beam, e.g. a mirror image of the primary beam. A third plot 1406 depicts a drift of a centroid determined based an average of the first plot 1402 and the second plot 1404. The third plot 1406 demonstrates reduced drift relative to the first plot 1402 and the second plot 1404. For example, a total amount of drift, representing long-term noise, observed in the third plot 1406 may be one pixel, e.g., 200 nm. An amount of unfiltered, instantaneous noise, e.g., short-term noise, in the third plot 1406 may be 0.5 pixels. Magnitudes of each of the short-term and long-term noise may therefore be below a depth of field of a 20× objective with a high numeral aperture, as an example.

An example of a method 1500 for automatically focusing a microscope is illustrated in FIG. 15. The method 1500 may be applied to an auto-focus system of the microscope, such as the auto-focus system 200 of FIG. 2, where the auto-focus system includes a laser light source and a cube beamsplitter configured to split a laser beam from the laser light source into a pair of beams including a primary beam and a secondary beam, the secondary beam a mirror reflection of the primary beam. The pair of beams may be directed to and from a sample (e.g., a glass slide) by a pair of mirrors with dimensions as small as possible to enable reflection of the pair of beams while minimizing a footprint of the pair of mirrors. A specimen may be arranged along a surface of the sample distal to the objective, e.g., at a GW interface of the sample. The method may be initiated upon activating the microscope from a deactivated state, e.g., all electronic components of the microscope are off or on standby. For example, activating the microscope may include turning on a light source of an illumination system of the microscope or turning on/waking up a controller, such as the controller 116 of FIG. 1. Instructions for carrying out method 1500 may be executed by the controller based on instructions stored on a memory of the controller and in conjunction with signals received from a sensor of the auto-focus system, such as the sensor 102 of FIG. 1, as well as an optical signal received at a detector of the auto-focus system, such as the detector 114 of FIGS. 1 and 2. The controller may command adjustment of a position of the objective and/or the sample in response to the signals described above, according to the method described below.

At 1502, the method includes confirming if a sample holder is present. For example, the sample holder may be a glass slide, a microplate, etc. used to support a sample or specimen for imaging. In some examples, the sample may be present and reflection of the interrogation beam from the sample may be used for auto-focusing. In other examples, the sample may be absent and reflection of the interrogation beam from the sample holder may be used for auto-focusing the microscope. The presence of the sample holder may be determined based on reception of an optical signal at the detector. As one example, when a light source of an illumination system of the microscope is activated, an incident light beam from the light source is not reflected and an image is therefore not provided by the detector. The lack of the image may indicate that the sample holder is not present. Similarly, if the laser light source of the auto-focus system is already turned on, e.g., generating a laser beam, a lack of detection of the pair of beams at the detector indicates that the sample holder is not in place.

If the sample holder is not present, the method includes deactivating the laser light source at 1504, or maintaining the laser light source deactivated if already turned off. The method returns to the start. If the sample holder is confirmed to be present, the method proceeds to 1506 to activate the laser light source. However, if the laser light source is already on, the method may skip 1506 and continue to 1508.

At 1508, the method includes generating a 2D detector array based on transmission of the pair of beams from reflection at the sample to the detector via the objective and one of the pair of mirrors. Generating the 2D detector array may include plotting laser spots of the pair of beams along an axis. As shown in FIG. 10, the 2D detector array may include a first set of laser spots corresponding to reflection of the pair of beams at a GA interface of the sample and a second set of laser spots corresponding to reflection of the pair of beams at the GW interface of the sample.

Generating the 2D detector array may also include identifying which of the sets of laser spots may be assigned to the GA and the GW interfaces. The method proceeds to generate a 1D intensity profile based on the 2D detector array at 1512 which may be plotted as set of peaks representing spectral intensities of the sets of laser spots. A centroid for each set of peaks may be determined.

At 1512, coordinates of the centroid of the GA interface, with respect to an axis of the optical train, e.g., the axis 150 of FIGS. 1, 2, and 7, is determined. For example, the spectral intensity peaks for the first set of laser spots reflected from the GA interface may be identified and a relative position of each intensity peak may be inferred along the axis of the optical train. The coordinates of the GA interface may be used to interpolate a distance of the GA interface from the objective.

At 1514, the method includes calibrating a distance between the GA interface and the GW interface across a ROI of the sample. As described above, in one example, variations in a thickness of the sample may be inferred by setting a rectangular ROI and measuring a displacement between beams reflected from the GA interface and from the GW interface at corners of the ROI. An interpolated displacement may be summed across the ROI and the displacement between the GA interface and the GW interface may be determined at any point within the ROI based on a discrepancy between an observed displacement and interpolated averaged centroid coordinates. As such, when calibration is complete, the method proceeds to estimate coordinates, e.g., the location along the axis of the optical train, of the GW interface at 1516.

In some instances, the sample may be configured to have a uniform thickness. As such, calibration of the displacement may be superfluous and time-consuming. Upon determining a lack of variation in the thickness after a first calibration execution, the controller may suppress further calibration of the sample. Alternatively, an operator may manually deactivate calibration by, for example, selecting an option to turn off calibration at a user interface, for example, for very thin biological samples.

At 1518, the method includes adjusting coordinates of the objective along the longitudinal axis of the optical train based on the estimated coordinates of the GW interface. For example, the objective may be raised or lowered relative to the sample to modify a distance between a tip of the objective and the GW interface where a target distance may be determined based on specific properties of the objective, such as a focal point distance. The method proceeds to confirm if a change in a position of the sample holder, e.g., along a plane perpendicular to the longitudinal axis, is detected at 1520.

In one example, the change in the sample holder position may be detected based on actuation of a motor used to move a stage on which the sample holder is supported. As another example, the position of the stage may be monitored by a position sensor. Various other methods of tracking the position of the sample holder may be utilized, however. If the sample holder position is detected to change, the method continues to 1522 to determine if the calibrated ROI is still within a field of view (FOV) of the microscope. If the sample holder has moved such that the ROI or a portion of the FOV is beyond the FOV, the method returns to 1514 to calibrate the displacement between the GA and the GW interfaces within a new ROI. If the calibrated ROI is still within the FOV, the method returns to 1516 to estimate the coordinates of the GW interface at the current FOV.

Returning to 1520, if the change in sample holder position is not detected, the method proceeds to 1524 to determine if a threshold amount of time has elapsed since a most recent adjustment to the microscope focus. The threshold amount of time may be set based on an exposure time of the first set of laser spots, for example. As an example, the exposure time may range between microseconds to milliseconds. As another example, the threshold may be set based on a camera frame rate. For example, the camera frame rate may be 10-100 Hz.

If the time elapsed is greater than the threshold, the method returns to 1502 to confirm the presence of the sample. If the time elapsed is equal to or less than the threshold, the method proceeds to 1526 to maintain the objective (and/or the sample) at the current coordinates. The method returns to 1520 to confirm if the sample holder position has changed.

In this way, a microscope may be adapted with a low cost and compact auto-focus system. The auto-focus system may include a beamsplitting device that splits a secondary beam off of a primary beam emitted from a laser light source. The laser light source may be one or more laser diodes configured with embedded collimating optics, thereby circumventing a demand for additional lenses, and able to generate a narrow (e.g., less than 1 mm wide) laser beam. The beamsplitting device may be a low cost and monolithic cube beamsplitter. The secondary beam may be a mirror reflection of the primary beam (e.g., optically flipped with respect to the primary beam) and travel through an objective in parallel with the primary beam. The pair of beams (e.g., the primary beam and the secondary beam) may converge and be reflected at a sample and travel back through the objective, in parallel, to be received at a detector. A pair of mirrors, arranged at an edge of an aperture of the microscope optical train, may be used to direct the passage of the pair of beams through the objective, thereby precluding use of a bulky dichroic mirror with an area similar to an entry aperture of the optical train. Using a common mode rejection application, processing of an optical signal delivered by the pair of beams at the detector may stabilize the microscope focus without relying on additional components to provide electrical and temperature stabilization. The processing may include determining a centroid that is averaged based on positions of the pair of beams in a 2D detector array and identifying coordinates of the centroid from a 1D intensity profile of the 2D detector array. Fluctuations in the microscope focus, e.g., drift, noise, etc., may be cancelled by adjusting the microscope focus based on the centroid, thereby maintaining the microscope focus at a target focal plane more robustly than conventional auto-focus systems. For example, the location of the sample along an axis of the microscope optical train may be inferred with high dynamic range (e.g., several hundreds of microns) and high resolution (e.g., at a sub-micron level). In addition, the processing may allow a location of a first surface of the sample, the first surface in direct contact with a specimen, to be monitored along the axis of the optical train without directly tracking the first surface, which may be confounded by distortion and interfering reflections. Instead, a location of second surface of the sample, opposite of the first surface, may be tracked and the location of the first surface inferred from the location of the second surface. A distance between the first surface and the second surface may be interpolated based on calibration measurements within a ROI. Thus, an overall footprint of the microscope may be maintained small while reducing costs.

The technical effect of implementing the auto-focus system described herein in a microscope is that by tracking a location of a centroid, the centroid being an average of a pair of mirrored beams, the microscope focus may be aligned with a target focal plane with high accuracy and efficiency.

The disclosure also provides support for a method for a microscope, comprising: focusing the microscope at a glass-specimen interface of a sample by passing a primary laser beam through a beamsplitting device to generate an additional, secondary laser beam, the secondary laser beam a mirror image of the primary laser beam, and triangulating a location of an objective relative to the glass-specimen interface along a longitudinal axis of the microscope based on a centroid of spectral intensities of each of the primary and the secondary laser beams. In a first example of the method, passing the primary laser beam through the beamsplitting device includes passing the primary laser beam through a cube beamsplitter and wherein the cube beamsplitter is a monolithic structure formed of two right-angle prisms, each of the right-angle prisms including a coating configured to transmit a first portion of the primary laser beam and reflect a second portion of the primary laser beam to form the secondary laser beam. In a second example of the method, optionally including the first example, triangulating the location of the objective relative to the glass-specimen interface includes generating a two-dimensional array at a detector based on an optical signal provided by reflection of the primary laser beam and the secondary laser beam from each of the glass-specimen interface and a glass-air interface of the sample, the glass-air interface at an opposite face of the sample from the glass-specimen interface. In a third example of the method, optionally including one or both of the first and second examples, triangulating the location of the glass-specimen interface further includes generating a one-dimensional profile of spectral intensity based on the two-dimensional array and inferring the centroid as an average of a location of the primary laser beam and a location of the secondary laser in the one-dimensional profile. In a fourth example of the method, optionally including one or more or each of the first through third examples, the method further comprises: interpolating the location of the glass-specimen interface by calibrating a displacement of the glass-specimen interface from the glass-air interface. In a fifth example of the method, optionally including one or more or each of the first through fourth examples, calibrating the displacement of the glass-specimen interface from the glass-air interface includes defining a ROI at the sample, measuring the displacement at points along the ROI and interpolating the displacement across an area of the ROI.

The disclosure also provides support for an auto-focus system for a microscope, comprising: a light source generating a laser beam, a set of mirrors oriented to direct the laser beam to and from an optical train of the microscope, a beamsplitting device configured to split the laser beam into a pair of beams, including a primary beam and a secondary beam, wherein the secondary beam is a mirror image of the primary beam, a controller, including executable instructions stored in non-transitory memory that, when executed, cause the controller to: apply a common mode rejection to define a centroid of an optical signal generated from reflections of the pair of beams at a sample, estimate a location of a target focal plane based on the centroid, align a focus of the microscope with the estimated location of the target focal plane, and maintain the focus of the microscope at the target focal plane during scanning and imaging of the sample. In a first example of the system, the light source is one or more laser diodes configured with embedded collimating optical components. In a second example of the system, optionally including the first example, the set of mirrors includes a first mirror positioned adjacent to an aperture of the optical train to guide the pair of beams from the light source to an objective of the microscope and a second mirror positioned adjacent to the aperture of the optical train to guide the pair of beams from the objective to a detector. In a third example of the system, optionally including one or both of the first and second examples, each of the first mirror and the second mirror have areas smaller than an entry aperture of the optical train. In a fourth example of the system, optionally including one or more or each of the first through third examples, the beamsplitting device is positioned between the light source and the first mirror of the set of mirrors. In a fifth example of the system, optionally including one or more or each of the first through fourth examples, the beamsplitting device is a cube beamsplitter formed of two right-angle prisms coupled to one another to form a monolithic structure and wherein facets of the two right-angle prisms in face-sharing contact include a coating configured to transmit a first portion of the laser beam and reflect a second portion of the laser beam. In a sixth example of the system, optionally including one or more or each of the first through fifth examples, the first portion of the laser beam is the primary beam and the second portion of the laser beam is the secondary beam and wherein a relative intensity of each of the primary beam and the secondary beam is adjusted by rotating a polarization of the laser beam at the light source. In a seventh example of the system, optionally including one or more or each of the first through sixth examples, a distance between the primary beam and the secondary beam is modified by adjusting a point of entry of the laser beam at the cube beamsplitter. In an eighth example of the system, optionally including one or more or each of the first through seventh examples, the optical signal is processed to generate a two-dimensional array plotting locations of each of the pair of beams along an abscissa of the two-dimensional array, the locations corresponding to coordinates of the sample along an axis of the optical train and wherein variations in a position of the sample along the axis are observed as changes to the locations of each of the pair of beams along the abscissa of the two-dimensional array.

The disclosure also provides support for a method for auto-focusing a microscope, comprising: generating coordinates of a first centroid based on a common mode rejection, the first centroid estimated based on a first pair of spectral intensity peaks corresponding to a pair of laser beams reflected from a first interface of a sample, inferring coordinates of a second interface of the sample, opposite of the first interface, based on a calibrated displacement of the second interface from the first centroid, and aligning a focus of the microscope with the second interface and maintaining the focus aligned with the second interface during scanning and imaging of the sample, wherein the pair of laser beams are mirror images of one another and split from a parent laser beam by a beamsplitting device. In a first example of the method, generating the coordinates of the first centroid includes plotting laser spots of the pair of laser beams in a two-dimensional detector array and plotting the first pair of spectral intensity peaks in a one-dimensional profile based on the two-dimensional detector array and wherein coordinates of the first pair of spectral intensity peaks in the one-dimensional profile correspond to coordinates of the laser spots of the pair of laser beams in the two-dimensional detector array. In a second example of the method, optionally including the first example, generating the coordinates of the first centroid further includes correlating a location of the first interface along a longitudinal axis of the microscope to the coordinates of the first centroid and wherein inferring the coordinates of the second interface includes estimating a location of the second interface along the longitudinal axis of the microscope relative to the location of the first interface. In a third example of the method, optionally including one or both of the first and second examples, the method further comprises: generating coordinates of a second centroid based on a second pair of spectral intensity peaks corresponding to reflection of the pair of laser beams from the second interface of the sample and wherein the second centroid is spaced away from the first centroid in the one-dimensional profile by a distance that is greater than a spread of each of the first pair and the second pair of spectral intensity peaks. In a fourth example of the method, optionally including one or more or each of the first through third examples, inferring coordinates of the second interface of the sample includes tracking a position of the sample along a longitudinal axis of the microscope across a range of hundreds of microns and with a sub-micron resolution.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a microscope, comprising:
focusing the microscope at a glass-specimen interface of a sample by passing a primary laser beam through a beamsplitting device to generate an additional, secondary laser beam, the secondary laser beam a mirror image of the primary laser beam, and triangulating a location of an objective relative to the glass-specimen interface along a longitudinal axis of the microscope based on a centroid of spectral intensities of each of the primary and the secondary laser beams.

2. The method of claim 1, wherein passing the primary laser beam through the beamsplitting device includes passing the primary laser beam through a cube beamsplitter and wherein the cube beamsplitter is a monolithic structure formed of two right-angle prisms, each of the right-angle prisms including a coating configured to transmit a first portion of the primary laser beam and reflect a second portion of the primary laser beam to form the secondary laser beam.

3. The method of claim 1, wherein triangulating the location of the objective relative to the glass-specimen interface includes generating a two-dimensional array at a detector based on an optical signal provided by reflection of the primary laser beam and the secondary laser beam from each of the glass-specimen interface and a glass-air interface of the sample, the glass-air interface at an opposite face of the sample from the glass-specimen interface.

4. The method of claim 3, wherein triangulating the location of the glass-specimen interface further includes generating a one-dimensional profile of spectral intensity based on the two-dimensional array and inferring the centroid as an average of a location of the primary laser beam and a location of the secondary laser in the one-dimensional profile.

5. The method of claim 4, further comprising interpolating the location of the glass-specimen interface by calibrating a displacement of the glass-specimen interface from the glass-air interface.

6. The method of claim 5, wherein calibrating the displacement of the glass-specimen interface from the glass-air interface includes defining a ROI at the sample, measuring the displacement at points along the ROI and interpolating the displacement across an area of the ROI.

7. An auto-focus system for a microscope, comprising:
a light source generating a laser beam;
a set of mirrors oriented to direct the laser beam to and from an optical train of the microscope;
a beamsplitting device configured to split the laser beam into a pair of beams, including a primary beam and a secondary beam, wherein the secondary beam is a mirror image of the primary beam;

a controller, including executable instructions stored in non-transitory memory that, when executed, cause the controller to:
apply a common mode rejection to define a centroid of an optical signal generated from reflections of the pair of beams at a sample;
estimate a location of a target focal plane based on the centroid;
align a focus of the microscope with the estimated location of the target focal plane; and
maintain the focus of the microscope at the target focal plane during scanning and imaging of the sample.

8. The auto-focus system of claim 7, wherein the light source is one or more laser diodes configured with embedded collimating optical components.

9. The auto-focus system of claim 7, wherein the set of mirrors includes a first mirror positioned adjacent to an aperture of the optical train to guide the pair of beams from the light source to an objective of the microscope and a second mirror positioned adjacent to the aperture of the optical train to guide the pair of beams from the objective to a detector.

10. The auto-focus system of claim 9, wherein each of the first mirror and the second mirror have areas smaller than an entry aperture of the optical train.

11. The auto-focus system of claim 9, wherein the beam-splitting device is positioned between the light source and the first mirror of the set of mirrors.

12. The auto-focus system of claim 7, wherein the beam-splitting device is a cube beamsplitter formed of two right-angle prisms coupled to one another to form a monolithic structure and wherein facets of the two right-angle prisms in face-sharing contact include a coating configured to transmit a first portion of the laser beam and reflect a second portion of the laser beam.

13. The auto-focus system of claim 12, wherein the first portion of the laser beam is the primary beam and the second portion of the laser beam is the secondary beam and wherein a relative intensity of each of the primary beam and the secondary beam is adjusted by rotating a polarization of the laser beam at the light source.

14. The auto-focus system of claim 13, wherein a distance between the primary beam and the secondary beam is modified by adjusting a point of entry of the laser beam at the cube beamsplitter.

15. The auto-focus system of claim 7, wherein the optical signal is processed to generate a two-dimensional array plotting locations of each of the pair of beams along an abscissa of the two-dimensional array, the locations corresponding to coordinates of the sample along an axis of the optical train and wherein variations in a position of the sample along the axis are observed as changes to the locations of each of the pair of beams along the abscissa of the two-dimensional array.

16. A method for auto-focusing a microscope, comprising:
generating coordinates of a first centroid based on a common mode rejection, the first centroid estimated based on a first pair of spectral intensity peaks corresponding to a pair of laser beams reflected from a first interface of a sample;
inferring coordinates of a second interface of the sample, opposite of the first interface, based on a calibrated displacement of the second interface from the first centroid; and
aligning a focus of the microscope with the second interface and maintaining the focus aligned with the second interface during scanning and imaging of the sample;
wherein the pair of laser beams are mirror images of one another and split from a parent laser beam by a beam-splitting device.

17. The method of claim 16, wherein generating the coordinates of the first centroid includes plotting laser spots of the pair of laser beams in a two-dimensional detector array and plotting the first pair of spectral intensity peaks in a one-dimensional profile based on the two-dimensional detector array and wherein coordinates of the first pair of spectral intensity peaks in the one-dimensional profile correspond to coordinates of the laser spots of the pair of laser beams in the two-dimensional detector array.

18. The method of claim 17, wherein generating the coordinates of the first centroid further includes correlating a location of the first interface along a longitudinal axis of the microscope to the coordinates of the first centroid and wherein inferring the coordinates of the second interface includes estimating a location of the second interface along the longitudinal axis of the microscope relative to the location of the first interface.

19. The method of claim 17, further comprising generating coordinates of a second centroid based on a second pair of spectral intensity peaks corresponding to reflection of the pair of laser beams from the second interface of the sample and wherein the second centroid is spaced away from the first centroid in the one-dimensional profile by a distance that is greater than a spread of each of the first pair and the second pair of spectral intensity peaks.

20. The method of claim 16, wherein inferring coordinates of the second interface of the sample includes tracking a position of the sample along a longitudinal axis of the microscope across a range of hundreds of microns and with a sub-micron resolution.

* * * * *